United States Patent [19]

Khan

[11] Patent Number: 5,234,468
[45] Date of Patent: Aug. 10, 1993

[54] PROCESS FOR UTILIZING A PUMPABLE FUEL FROM HIGHLY DEWATERED SEWAGE SLUDGE

[75] Inventor: Motasimur R. Khan, Wappingers Falls, N.Y.

[73] Assignee: Texaco Inc., White Plains, N.Y.

[21] Appl. No.: 722,811

[22] Filed: Jun. 28, 1991

[51] Int. Cl.$^5$ ............................................. C10J 3/46
[52] U.S. Cl. ......................... 48/197 A; 48/198.1; 48/DIG. 7; 48/209; 110/346; 210/758
[58] Field of Search ............. 48/197 R, 197 A, 202, 48/206, 209, DIG. 7, 198.1; 252/373; 44/605, 280, 281, 282; 210/769, 774, 603, 761, 758, 764; 110/341, 342, 246, 347, 348; 60/39.02

[56] References Cited

U.S. PATENT DOCUMENTS

| | | | |
|---|---|---|---|
| 3,232,728 | 2/1966 | Reynolds | 48/215 |
| 3,507,788 | 4/1970 | Cole et al. | 210/63 |
| 3,524,630 | 8/1970 | Marion | 261/76 |
| 3,687,646 | 8/1972 | Brent et al. | 48/209 |
| 3,847,564 | 11/1974 | Marion et al. | 48/95 |
| 4,052,176 | 10/1977 | Child et al. | 55/32 |
| 4,443,230 | 4/1984 | Stellaccio | 48/DIG. 7 |
| 4,525,175 | 6/1985 | Stellaccio | 48/86 |
| 4,762,527 | 8/1988 | Beshore et al. | 44/605 |
| 4,801,307 | 1/1989 | Muenger et al. | 48/69 |
| 4,933,086 | 6/1990 | McMahon et al. | 210/603 |
| 4,983,296 | 1/1991 | McMahon et al. | 210/603 |

FOREIGN PATENT DOCUMENTS 3046146 7/1982 Fed. Rep. of Germany ...... 210/769
63-283799 11/1988 Japan ................................ 210/769

OTHER PUBLICATIONS

Perry's Chemical Engineers' Handbook, McGraw-Hill, Fourth Edition, 1963, pp. 19-50.

*Primary Examiner*—Peter Kratz
*Attorney, Agent, or Firm*—James J. O'Loughlin; Albert Brent

[57] ABSTRACT

A process for disposing of sewage sludge comprising the steps of, (1) dewatering the sewage sludge to produce amorphous sewage sludge having a solids content of about 28 to 50 wt. %; (2) heating said amorphous sewage sludge at about 150° F. to 510° F. in the absence of air for 3 seconds to 60 minutes and mildly shearing the sewage sludge, thereby producing a pumpable feed slurry of sewage sludge having a viscosity in the range of about 400 to 1500 centipoise and a higher heating value in the range of about 5000 to 9500 BTU/LB; and (3) burning said pumpable slurry from (2) in a partial oxidation gasifier, furnace, boiler, or incinerator to produce an effluent gas stream. In one embodiment, the effluent gas stream is cleaned and purified and non-contaminating fly-ash and slag are separated. The fly-ash may be mixed with the sewage sludge in the process to facilitate separation of water during pressing and to encapsulate the non-combustible materials in the sewage sludge. The encapsulated material will flow from the reaction zone as substantially inert molten slag. By this process, noxious sewage sludge may be disposed of without contaminating the environment.

12 Claims, No Drawings

PROCESS FOR UTILIZING A PUMPABLE FUEL FROM HIGHLY DEWATERED SEWAGE SLUDGE

FIELD OF THE INVENTION

This invention relates to an improved process for disposing of sewage sludge.

The hydrothermal treatment of sewage sludge is discussed in coassigned U.S. Pat. No. 3,507,788. Sewage sludge in combination with a liquid fuel is gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. 4,983,296. However, none of these references taken singly or in combination, teach or suggest the subject invention by which sewage sludge is highly dewatered to a solids content in the range of about 28 to 50 wt. %, heated at a temperature in the range of about 150° F. to 510° F. in the absence of air, and mildly sheared to produce a free-flowing pumpable slurry fuel having a higher heating value in the range of about 5000 to 9500 BTU/LB. The pumpable slurry may be burned as fuel in a partial oxidation gasifier, furnace, boiler, or incinerator.

SUMMARY OF THE INVENTION

This invention pertains to an improved process for disposing of sewage sludge comprising:

(1) dewatering an aqueous slurry of sewage sludge having a solids content of at least about 3 wt. % to produce an aqueous slurry of sewage sludge having a solids content in the range of about 5 to 20 wt. %;

(2) pressing and/or centrifuging the dewatered slurry of sewage sludge from (1) to produce amorphous sewage sludge having a solids content in the range of about 28 to 50 wt. %;

(3) heating the amorphous sewage sludge from (2) in a closed pressure vessel at a temperature in the range of about 150° F. to 510° F. in the absence of air for a period in the range of about 3 seconds to 60 minutes and mildly shearing the sewage sludge, thereby producing a pumpable slurry of sewage sludge having viscosity in the range of about 400 to 1500 centipoise and a higher heating value in the range of about 5000 to 9500 BTU/LB; and (4) burning said pumpable slurry from (3) in a partial oxidation gasifier, furnace, boiler, or incinerator to produce an effluent gas stream.

In a preferred embodiment to avoid contaminating the environment, the effluent gas stream is cleaned and purified and non-contaminating ash and slag are separated from the stream of gases.

DESCRIPTION OF THE INVENTION

Sewage sludge is a heterogeneous mixture of complex organic and inorganic materials. Sewage sludge does not behave as a Newtonian fluid. Accordingly, any analyses of sludge flow behavior in pipes is rather difficult. A major problem is the energy (head) loss in sludge transfer due to friction. Sludge slurries with 10–15% concentration can be pumped provided high friction losses are allowable. The physical state of sludge depends upon the amount of moisture present in the sludge and on the nature of the sludge. As the moisture content decreases, the sludge changes state from a true liquid to a semi-solid and ultimately to a dry solid. Through the use of gravity thickening the sludge could approach 3–5% solid concentration. However, the void spaces between the particle are still filled with water. As the moisture content decreases further, the solids are pushed closer together. The capillary forces continue to increase in the pore structure which progressively decreases the sludge volume. At this point the sludge is considered almost solid (plastic or semi-solid) rather than a liquid. With a further reduction in water content the nature of sludge is changed to such a state that it will not flow under its own weight. Plastic sludges are cohesive in nature due to the surface chemical activity and the bonding properties of the organic and inorganic colloidal materials present.

With landfills closing, ocean dumping being curtailed, and high-technology incinerators becoming unpopular in many areas, communities are finding that it is getting increasingly more difficult and expensive to dispose of their sewage sludge. Pumpable aqueous slurries of sewage sludge are made by the subject process containing high concentrations of sewage sludge. The pumpable slurry may be used as a fuel in a partial oxidation gas generator and may be thereby disposed of without contaminating the atmosphere. After cleaning and removal of undesirable gases e.g. $H_2O$, $COS$, $CO_2$, a nonpolluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace.

The term "sewage sludge" as used herein may be broadly defined as "water-carried wastes", particularly from municipal sanitary sewage lines, containing at least one of the following: body wastes (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply.

Sewage sludge is obtained from raw sewage and may contain a number of pathogens known to be health hazards to humans. Almost any type of microorganism may be found in sewage, including bacteria, protozoans, viruses and fungi.

The slurry of sewage sludge, optionally in admixture with natural gas, is preferably reacted with a free oxygen-containing gas by partial oxidation in a free-flow non-catalytic gas generator. Noxious sewage sludge is safely disposed of by the subject process without polluting the nation's environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed. This process has the following advantages:

(a) Noxious sewage or industrial sludge is disposed of without polluting the environment, and clean fuel gas and/or synthesis gas is produced.

(b) By-product synthesis gas may be used in the catalytic synthesis of organic chemicals e.g. methanol.

(c) The slag produced during the partial oxidation of the mixed feed of sludge and solid carbonaceous fuel is free of pollutants, and is non-hazardous. Further, it is non-leachable.

(d) The process has a high thermal efficiency. The hot effluent gas stream from the partial oxidation gas generator, furnace, or incinerator may be cooled in a waste heat boiler. Internally generated steam produced in the waste heat boiler may be used to heat the dewatered sewage sludge. The steam may be also used as the working fluid in an expansion turbine.

A typical ultimate analysis of sewage sludge is shown in Table I. A typical ultimate analysis of inert non-combustible materials in sewage sludge is shown in Table II. The higher heating value (BTU/lb) of dry sewage sludge is in the range of about 5000 to 9500.

TABLE I

TYPICAL ULTIMATE ANALYSIS OF COMBUSTIBLES IN SEWAGE SLUDGE

| ELEMENT | WT. % |
| --- | --- |
| CARBON | 54.6 |
| HYDROGEN | 7.9 |
| NITROGEN | 4.5 |
| OXYGEN | 32.0 |
| SULFUR | 1.0 |

TABLE II

TYPICAL ANALYSIS OF INERT NON-COMBUSTIBLE MATERIALS IN SEWAGE SLUDGE

| ELEMENT | MG/KG DRY SOLIDS |
| --- | --- |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The Economics of gasifying sewage sludge depend greatly on the tipping fee received from the sludge generating community and the concentration of sewage sludge that can be included in a pumpable slurry destined for the gasifier. Mixtures of sewage sludge containing about 20 to 50 wt. % of solids and liquid hydrocarbonaceous or solid carbonaceous fuel e.g. coal and/or petroleum coke that contain sufficient sewage sludge to be profitably burned are ordinarily too viscous to be pumped. This problem and others have been overcome by the subject invention.

Sewage Sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, a pumpable aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. 3,687,646, which is incorporated herein by reference.

The purified water may be then used subsequently in the process. For example, it may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Excess water may be discharged from the system or used externally for industrial applications.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

The sludge underflow from the primary sedimentation tank comprising primary sewage sludge or from the holding tank comprising primary sewage sludge in admixture with secondary sewage sludge having a solids content of at least about 3 wt. % is dewatered further to produce a pumpable aqueous slurry of sewage sludge having a solids content in the range of about 5 to 20 wt. %. Dewatering may be achieved by conventional means, e.g. filter press, hydroclone, centrifuge.

The aqueous slurry of sewage sludge having a solids content in the range of about 5 to 20 wt. % is further dewatered by pressing and/or centrifuging to produce amorphous sewage sludge having a solids content in the range of about 28 to 50 wt. %, such as about 30 to 45 wt. %. Pressing is accomplished by means of conventional continuous belt pressure filters wherein the sewage sludge is pressed between two moving belts that pass between and over rollers. A surface pressure in the range of about 20 to 200 pounds per square inch (psi) for a period in the range of about ½ to 60 minutes, such as about 1 to 30 minutes, say about 3 minutes is applied to the sewage sludge. Liquid water is thereby quickly pressed from the sewage sludge. For example, the conventional Andritz Co. Arlington, Tex. Continuous Press Filter (CPF) operating at ambient conditions with a surface pressure of about 20 psi will produce a press cake having a solids content in the range of about 28 to 45 wt. %. Optionally, on discharge from the CPF, the press cake may be optionally further dewatered in a conventional Andritz Co. High Intensity Press (HIP) continuous belt filter press operating with a surface pressure of about 200 psi for a similar period to produce press cake having a solids content in the range of about 28 to 50 wt. %. Optionally, additional dewatering may be provided by heating the sludge to a temperature in the range of about 100° to 140° C. during said high intensity pressing. Conventional filter additives in the amount of about 1-10 wt. % (basis wt. of sewage sludge) may be used e.g., $CaCO_3$ or coal having a particle size of less than about 2 mm, such as about 1 mm. Alternatively, fly-ash that is produced in a partial oxidation reactor or a fluidized bed combustor, to be further discussed, may be also used as the filter additive, to facilitate water removal during pressing.

In one embodiment, the sewage sludge is concentrated by centrifuging or by a combination of continuous belt pressure filtering and centrifuging. The use of centrifuges for sludge dewatering is discussed by Lipke, S., Water: Engineering & Management, June 1990, pages 22-25. For example, by centrifuging at about 3,000 to 30,000 rpm, such as about 7,000 to 10,000 rpm for about 0.1 to 5.0 minutes, such as about 1.0 to 2.0 minutes, the solids content of the sewage sludge may be increased from about 15 to 30 wt. % to about 28 to 50 wt. %.

The pressed and/or centrifuged dewatered sewage sludge having a solids content of about 28 to 50 wt. %, is heated in a closed pressure vessel at a temperature in the range of about 150° F. to 510° F., such as about 155° F. to 210° F., say about 180° F. to 350° F. in the absence of air for a period in the range of about 3 seconds to 60 minutes, such as about 5 seconds to 20 minutes, and mildly sheared. The pressure in the vessel is greater than the vapor pressure of water at said temperature. Mild shearing is accomplished with a venturi mixer, jet aspirator, flow pump, rotor/mixer e.g. propeller, homogenizer, turbine having a speed in the range of about 15 to 100 rpm, such as about 30 to 70 rpm and combinations thereof. The rate of shear is minimum and is sufficient only to transfer the heat to the sewage sludge. The sewage sludge is preferably heated and sheared, simultaneously. In one embodiment, the sewage sludge is first heated to temperature e.g. 150° F. to 510° F., and then sheared. A homogeneous pumpable slurry having a viscosity at 200° F. in the range of about 400 to 1500 centipoise, such as less than about 1000 centipoise, and a higher heating value of at least 5000 BTU/LB, such as about 5000 to 9500 BTU/LB, and a solids content in the range of about 28 to 50 wt. % is thereby produced.

It was unexpectedly found that mild shearing is a very effective way to improve the slurrying characteristics and solids content of dewatered sewage sludge. Conditioning requirements are greatly influenced by the fact that the surface of the sewage sludge particles tends to acquire an electrical charge by preferential adsorption of ions from the solution or by ionization of functional groups present in the sludge. The colloidal charge may be reduced by the use of inorganic chemicals or by polymers. Particulate agglomeration is thereby promoted. This also promotes desorption of bound water. The formation of floc, however is detrimental to the flow characteristics of the sludge.

Optionally, if necessary the water content of the slurry may be adjusted by removing a small amount of water. Conventional dewatering equipment, for example evaporation, may be used to provide a pumpable aqueous slurry of sewage sludge having a solids content in the range of about 50 to 60 wt. %.

The profit that can be made from the subsequent burning of the pretreated sewage sludge is determined by the percentage of sewage sludge in the feed to the partial oxidation gasifier; or, alternatively in the feed to the furnace, boiler, or incinerator. When gasification of sewage sludge alone is not very efficient, due to a low heating value of the sewage sludge, in one embodiment natural gas is used as a supplementary fuel. The term "and/or" is used herein in its normal sense. For example, "A and/or B" means either A or B, or A and B.

The aqueous pumpable feed slurry of sewage sludge with or without natural gas and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference. The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular type burner, such as shown and described in coassigned U.S. Pat. Nos. 3,847,564 and 4,525,175, which are incorporated herein by reference, may be used to introduce the feedstreams into the partial oxidation gas generator. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e. greater than 21 mole % $O_2$, and air. The free-oxygen containing gas is supplied at a temperature in the range of about 100° F. to 1000° F. The aqueous slurry of pretreated sewage sludge is passed through the intermediate annular passage 16 at a temperature in the range of about ambient to 650° F. In one embodiment, a stream of natural gas replaced one of the streams of free-oxygen containing gas passing through the central conduit or the outer annular passage.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.85 to 1.5, such as about 1.0 to 1.2. Advantageously, the high amount of combined oxygen in the sewage sludge reduces the amount of free-oxygen.

The relative proportions of fuels, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1-35 atmospheres. Preferably the temperature in the gasifier is in the range of about 2200° F. to 2800° F., so that molten slag is produced.

The dwell time in the partial oxidation reaction zone is in the range of about 1 to 10 seconds, and preferably in the range of about 2 to 8 seconds. With substantially pure oxygen feed to the partial oxidation gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S+COS$ 0 to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ 0 to 2, 1 $H_2S+COS$ 0 to 3, $N_2$ 45 to 80, and Ar 0.5 to 1.5. Unconverted carbon, ash, or molten slag are contained in the effluent gas stream. Depending on the composition and use, the effluent gas stream from the partial oxidation gasifier is called synthesis gas, reducing as, or fuel gas. In one embodiment, fly-ash from the partial oxidation reactor or a fluidized bed combustor and having a particle size in the range of about 0.1 to 2.0 microns is mixed with the pumpable feed slurry of sewage sludge in the amount of about 1.0 to 10.0 wt. % (basis wt. % of sewage sludge) to encapsulate the non-combustible materials in the sewage sludge. The encapsulated material will flow from the reaction zone of the gas generator as substantially inert molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The gas stream from the partial oxidation gasifier or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag maybe removed by quenching the process gas stream in a conventional quench tank and/or by scrubbing. See coassigned U.S. Pat. Nos. 3,232,728; 3,524,630; and 4,801,307, which are incorporated herein by reference. The fly-ash maybe mixed with the sewage sludge in the process to facilitate separation of water during pressing and to encapsulate the non-combustible materials in the sewage sludge.

Although modifications and variations of the invention may be made without departing from the spirit and scope thereof, only such limitations should be imposed as are indicated in the appended claims.

I claim:

1. A process for disposing of sewage sludge comprising:
   (1) dewatering an aqueous slurry of sewage sludge having a solids content of at least about 3 wt. % to produce an aqueous slurry of sewage sludge having a solids content in the range of about 5 to 20 wt. %;
   (2) pressing and/or centrifuging the dewatered slurry of sewage sludge from (1) to produce amorphous sewage sludge having a solids content in the range of about 28 to 50 wt. %;
   (3) heating the amorphous sewage sludge from (2) in a closed pressure vessel at a temperature in the range of about 150° F. to 510° F. in the absence of air for a period in the range of about 3 seconds to 60 minutes and shearing the sewage sludge by a rotor/mixer operating at a speed in the range of about 15 to 100 rpm, thereby producing a pumpable slurry of sewage sludge having a viscosity in the range of about 400 to 1500 centipoise when a measured at 200° F. and a higher heating value in the range of about 5000 to 9500 BTU/LB, dry basis; and
   (4) burning said pumpable slurry from (3) in a partial oxidation gasifier, furnace, boiler, or incinerator to produce an effluent gas stream.

2. The process of claim 1 where in (2) said pressing of the sewage sludge takes place in a continuous belt filter press with or without subsequent pressing in a high intensity press; where in said belt filter press a surface pressure in the range of about 20 to 200 psi is applied to said sewage sludge for a period in the range of about ½ to 60 minutes, and in said high intensity press a surface pressure of about 200 psi is applied to said sewage sludge for a period in the range of about ½ to 60 minutes.

3. The process of claim 1 where in (2) said sewage sludge is centrifuged at about 3,000 rpm to 30,000 rpm for a period in the range of about 0.1 to 5.0 minutes.

4. The process of claim 1 wherein said rotor/mixer is selected from the group consisting of propeller, homogenizer, and turbine.

5. The process of claim 1 wherein the heating and shearing in (3) takes place simultaneously or sequentially.

6. The process of claim 1 wherein the heating and shearing in (3) takes place at a pressure which is greater than the vapor pressure of water at the temperature in (3).

7. The process of claim 1 wherein the pumpable slurry of sewage sludge from (3) and a supplemental stream of natural gas are burned as fuel in a partial oxidation gasifier.

8. The process of claim 1 wherein the pumpable slurry of sewage sludge from (3) is introduced into said partial oxidation gasifier by way of an annular-type burner comprising a central conduit, an intermediate annular passage and an outer annular passage; wherein a stream of free-oxygen containing gas is simultaneously passed through said central conduit and outer annular passage, and said slurry of sewage sludge from (3) is passed through said intermediate annular passage.

9. The process of claim 1 provided with the steps of cleaning and purifying the effluent gas stream from (4) and separating out fly-ash and slag.

10. The process of claim 1 wherein fly-ash in the amount of about 1 to 10 wt. % basis wt. of the slurry of sewage sludge from (1) is mixed with the slurry sewage sludge to facilitate water removal in (2) and to encapsulate the non-combustible materials in the sewage sludge.

11. The process of claim 1 where in (4) said pumpable slurry is burned in a partial oxidation gasifier with a free-oxygen containing gas at a temperature in the range of about 1800° F. to 3500° F., a pressure in the range of about 1 to 35 atmospheres, a weight ratio of $H_2O$ to carbon in the feed in the range of about 0.2 to 3.0, and an atomic ratio of free-oxygen to carbon in the range of about 0.85 to 1.5 to produce an effluent stream of synthesis gas, reducing gas or fuel gas.

12. The process of claim 1 wherein the pumpable of sewage sludge slurry from (3) is introduced into said partial oxidation gasifier by way of an annular-type burner comprising a central conduit, an intermediate annular passage and an outer annular passage; wherein a stream of natural gas is passed through said central conduit or outer annular passage; said slurry of sewage sludge from (3) is passed through said intermediate annular passage; and a stream of free-oxygen containing gas is passed through the remaining passage.

* * * * *